No. 850,472. PATENTED APR. 16, 1907.
E. A. FORSBERG.
CENTRIFUGAL MACHINE.
APPLICATION FILED MAY 19, 1905.

Witnesses:
M. M. Hamilton
Thomley B. Wood.

Inventor
Eric August Forsberg
by Harding & Harding
attys.

UNITED STATES PATENT OFFICE.

ERIK AUGUST FORSBERG, OF STOCKHOLM, SWEDEN, ASSIGNOR TO AKTIEBOLAGET SEPARATOR, OF STOCKHOLM, SWEDEN.

CENTRIFUGAL MACHINE.

No. 850,472.     Specification of Letters Patent.     Patented April 16, 1907.

Application filed May 19, 1905. Serial No. 261,136.

*To all whom it may concern:*

Be it known that I, ERIK AUGUST FORSBERG, a subject of the King of Sweden, residing at Stockholm, Sweden, have invented certain new and useful Improvements in Centrifugal Machines for Separating Solid Matters from Liquids; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in centrifugal separators such as used for separating liquids from solid matters, and more especially to separators of such art as described in my United States Patent No. 773,489; and it more particularly relates to arrangements for facilitating the motion of the scraper-wheels. As is more fully described in the said United States Patent No. 773,489, the solid matters that stratify along the inner wall of the bowl are brought outside the bowl by means of scraper-wheels carrying the solid matters transversely through the layer of liquid to a point within the same nearer the center of the bowl, whence the solid matters are continuously carried away in such a manner that they immediately before the scrapers of the scraper-wheels occupy their position nearest the center of the bowl, owing to the action of the centrifugal force and their own gravity, are loosened from the scrapers and then thrown downward through a central opening into a partition placed under the scraper-wheels or in the very bottom of the bowl. These scraper-wheels are secured to cog-wheels gearing with a cog-ring, and in this way they will receive their rotary motion. It is, however, obvious that by high rotary speed of the bowl it is difficult to journal the cog-wheels and scraper-wheels in a satisfactory manner on account of the action of the centrifugal force, and besides it is impossible to lubricate the parts as they are fully immersed in the mixture of fluid and solid matters.

My present invention has for object a device by which these inconveniences are avoided. Said device is illustrated on the annexed drawings, where—

Figure 1:
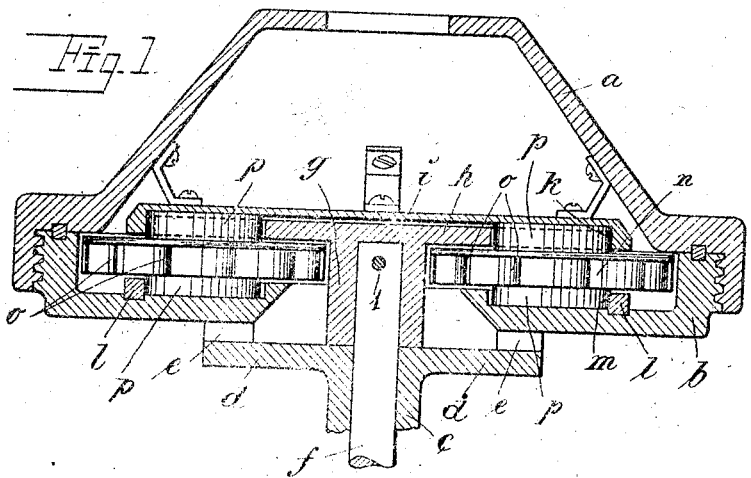
Figure 2:
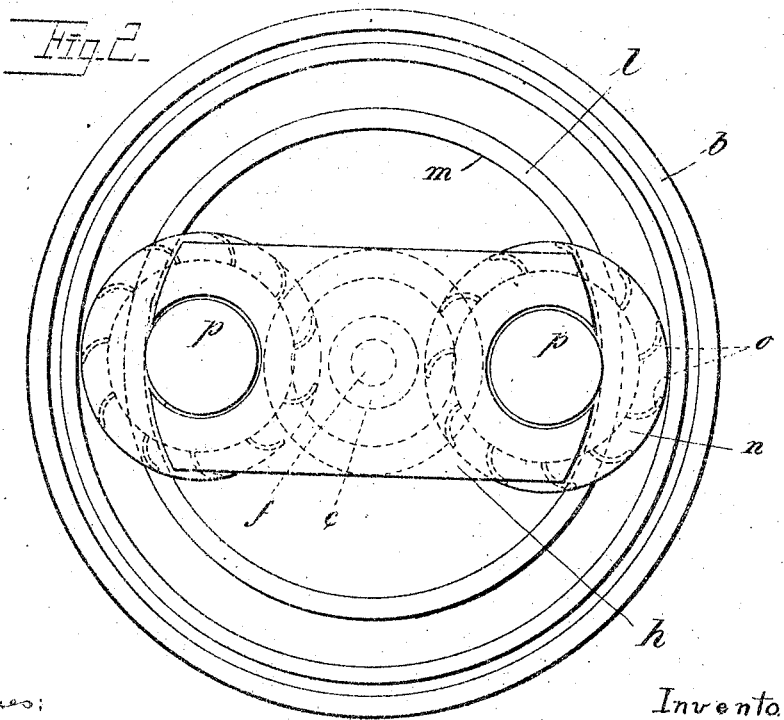

Figure 1 is a vertical section of a centrifugal bowl with my improvements applied thereto. Fig. 2 shows the same bowl in plan view, the cover and the upper rolling surface being removed.

The bowl is composed of an upper part or cover $a$ and an under part or bottom $b$, screwed together in the usual manner. The bottom is provided with a central circular orifice, the edges of which incline outward. The driving-shaft $c$ of the bowl is enlarged at the top to a flange $d$, riveted to the bottom of the bowl or integral therewith. Between the flange $d$ and the bottom $b$ of the bowl channels $e\ e$ are located. The driving-shaft $c$ is hollow, and within the same the massive shaft $f$ moves. At the top of said massive shaft the nave $g$ of the cross-piece $h$ is secured by pin 1. This cross-piece $h$ is at its ends provided with circular holes located in the very edge of the ends of the cross-piece, so that these holes open outward. Immediately above the cross-piece $h$ a circular disk $i$ is located, said disk being secured to the cover $a$ by means of stays or the like. Furthermore, the disk $i$ is provided with a central circular boring, so that an annular rolling surface $k$ is formed.

In the bottom $b$ of the bowl a ring $l$ is located in a circular groove formed in the bottom. The ring is located just below the ring-shaped edge of the disk $i$. Between said disk $i$ and the bottom $b$ of the bowl the scraper-wheels $n\ n$ are placed, which are provided with scrapers $o$ of scoop or shovel shape. The naves $p$ of said shovel-wheels are somewhat extended upward and downward, thus forming naves. Said naves $p$ press hard against the rolling surfaces $k$ and $m$ when the bowl rotates, so that a considerable friction between said parts arises. On account of this friction the naves roll along the surfaces $k$ and $m$ as soon as the cross-piece $h$ moves relative to the bowl. Said motion is imparted to the cross-piece $h$ by means of the massive shaft $f$ rotating with a higher or lower speed than the hollow shaft $c$. Thus as the cross-piece $h$ moves relative to the bowl it is evident that the scraper-wheels rotate not only on their own axes, but also that said axes receive a rotary movement around the center axis of the bowl. In this way a planetary movement is imparted to the scraper-wheels, so that they successively move along the periphery of the bowls. As the scrapers, however, rotate around the axis of the scraper-wheels, the solid matters stratified on the inner wall of the bowl will be brought by the scrapers transversely through the layer of liquid to the center of the bowl. Arriving at this point they are thrown off from the scrapers and slide down the inclined surface of the orifice in the bottom $b$ to the channels $e$, from where they leave the bowl.

What I claim is—

1. In a centrifugal machine, the combination with the rotary bowl, of a hollow shaft, there being an outlet between the walls of the bowl and the shaft, a second shaft projecting through said hollow shaft into the interior of the bowl, a cross-piece rigidly secured to said second shaft within the bowl and embracing the naves of one or more scraper-wheels, imparting to them a planetary movement along the entire periphery of the bowl, and a ring within the bowl having contact-surfaces in frictional contact with said scraper-wheels for imparting a rotary movement to said scraper-wheels around their own axes.

2. In a centrifugal machine, the combination with a rotary bowl, of one or more scraper-wheels rotatably mounted, and movable around the bowl, and a disk within the bowl having a contact-surface, said scraper-wheels being in frictional contact with said surfaces.

3. In a centrifugal machine, the combination with a rotary bowl, of one or more scraper-wheels rotatably mounted and movable around the bowl, a disk within the bowl having a contact-surface, said scraper-wheels being in frictional contact with said surface, the scraper-wheels and disk being supported to be adapted to have a differential rotation with respect to each other on the axial line of the bowl.

4. In a centrifugal machine, the combination with a rotary bowl, of one or more scraper-wheels rotatably mounted, a disk having a contact-surface, said scraper-wheels being in frictional contact with said surface, said disk and scraper-wheels being supported to be adapted to move around on the axis of the bowl at different speeds.

5. In a centrifugal machine, the combination with a rotary bowl, of one or more scraper-wheels rotatably mounted, and movable around the bowl, and a disk having contact-surfaces corresponding to said scraper-wheels in frictional contact with the scraper-wheels, said disk being connected with the bowl.

6. In a centrifugal machine, the combination with a rotary bowl, of one or more scraper-wheels rotatably mounted, a disk having a contact-surface in frictional contact with said scraper-wheels, said disk being connected with the bowl, and said scraper-wheels being adapted to move on the axis of the bowl at a speed different from that of the rotation of the disk.

7. In a centrifugal machine, the combination with a rotary bowl, of one or more rotating scraper-wheels therein for conveying the solid matters stratified on the wall of said bowl to a point near the central line of the bowl, a shaft, separate from the bowl-driving shaft, for driving said scraper-wheels, and a disk within the bowl having a contact-surface in frictional contact with said scraper-wheels.

8. In a centrifugal machine, the combination with a rotary bowl, of one or more rotating scraper-wheels therein for conveying the solid matters stratified on the wall of said bowl to a point near the central line of the bowl, a shaft, separate from the bowl-driving shaft, for driving said scraper-wheels, a disk connected with the bowl having a contact-surface in frictional contact with the upper portion of said scraper-wheels, and a ring secured to the bowl having a contact-surface in frictional contact with the lower portion of said scraper-wheels.

9. In a centrifugal machine, the combination with a rotary bowl, of one or more rotating scraper-wheels therein for conveying the solid matters stratified on the wall of the said bowl to a point near the central line of the bowl, a shaft, separate from the bowl-driving shaft, for driving said scraper-wheels, a disk connected with the upper part of the bowl and having a contact-surface in frictional contact with the upper portion of said scraper-wheels and a ring set into a groove in the bottom part of the bowl and having a contact-surface in frictional contact with the lower portion of said scraper-wheels.

10. In a centrifugal separator, the combination, with the rotary bowl and its driving-shaft, of a secondary shaft extending within the bowl and adapted to be rotated at a speed different from that of the bowl, rotating scraper-wheels within the bowl for conveying the solid matters stratified on the wall to a point near the central line of the bowl, a rotating member consisting of a cross-piece having holes in which the naves of the scraper-wheels revolve, and a disk having a contact-surface in frictional contact with said scraper-wheels, the cross-piece being connected with the secondary shaft and the disk turning with the bowl.

In testimony that I claim the foregoing as my invention I have signed my name in presence of two subscribing witnesses.

ERIK AUGUST FORSBERG.

Witnesses:
K. E. WIBERG,
HARRY ALBIHN.